(12) United States Patent
Hutson et al.

(10) Patent No.: US 10,407,168 B2
(45) Date of Patent: Sep. 10, 2019

(54) SPIN-LANDING DRONE

(71) Applicant: QUALCOMM Incorporated, San Diego, CA (US)

(72) Inventors: Donald Bolden Hutson, San Diego, CA (US); Charles Wheeler Sweet, III, San Diego, CA (US); Paul Ferrell, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 15/670,223

(22) Filed: Aug. 7, 2017

(65) Prior Publication Data
US 2019/0039728 A1 Feb. 7, 2019

(51) Int. Cl.
*B64C 29/00* (2006.01)
*B64C 39/02* (2006.01)
*B64C 39/00* (2006.01)

(52) U.S. Cl.
CPC .......... *B64C 29/0025* (2013.01); *B64C 29/00* (2013.01); *B64C 39/024* (2013.01); *B64C 39/003* (2013.01); *B64C 2201/021* (2013.01); *B64C 2201/042* (2013.01); *B64C 2201/145* (2013.01); *B64C 2201/146* (2013.01); *B64C 2201/18* (2013.01)

(58) Field of Classification Search
CPC ..................... B64C 29/0025; B64C 2201/18
See application file for complete search history.

(56) References Cited

U.S. PATENT DOCUMENTS

| | | | |
|---|---|---|---|
| 5,799,900 A | 9/1998 | McDonnell | |
| 7,997,526 B2 * | 8/2011 | Greenley | A63H 27/02 244/12.4 |
| 8,210,465 B2 | 7/2012 | Merems et al. | |

(Continued)

FOREIGN PATENT DOCUMENTS

| | | |
|---|---|---|
| EP | 2212198 A1 | 8/2010 |
| JP | 2009234551 A | 10/2009 |

(Continued)

OTHER PUBLICATIONS

International Search Report and Written Opinion—PCT/US2018/034043—ISA/EPO—dated Nov. 15, 2018, 16 pages.

*Primary Examiner* — Philip J Bonzell
*Assistant Examiner* — Michael B. Kreiner
(74) *Attorney, Agent, or Firm* — The Marbury Law Group, PLLC

(57) ABSTRACT

Various embodiments include a drone having a landing control device that is configured to rotate wings into an auto-rotation decent configuration causing the drone to enter a nose-down attitude and spin about a long axis of the drone, and to collectively control pivot angles of the wings to enables control of decent rate and lateral motion during an auto-rotation descent. The landing control device may be a landing carousel including a pivotal frame secured to a drone body and configured to rotate about a carousel axis extending laterally relative to a longitudinal axis of the body. The landing carousel may include a first wing motor configured to pivot a first wing about a wing pivot axis extending parallel to the carousel axis, and a second wing motor configured to pivot a second wing about the wing pivot axis independent of the pivot the first wing.

30 Claims, 7 Drawing Sheets

(56) References Cited

U.S. PATENT DOCUMENTS

| | | | |
|---|---|---|---|
| 8,991,751 B2* | 3/2015 | Page | B64C 29/02 244/78.1 |
| 2014/0008498 A1* | 1/2014 | Reiter | B64C 29/02 244/7 A |
| 2014/0231578 A1* | 8/2014 | Lavoie | B64D 47/08 244/13 |
| 2015/0225071 A1 | 8/2015 | Tighe | |
| 2019/0061935 A1* | 2/2019 | Wright | B64C 29/02 |

FOREIGN PATENT DOCUMENTS

| | | | | |
|---|---|---|---|---|
| WO | 9802350 A1 | 1/1998 | | |
| WO | 2012035153 A1 | 3/2012 | | |
| WO | WO-2018147810 A1 * | 8/2018 | | B64C 27/22 |

* cited by examiner

SPIN-LANDING DRONE

BACKGROUND

Unmanned aerial vehicles (UAVs), also referred to as "drones," are becoming more popular for unmanned delivery, survey, camera functions, and more. Often the range of a drone determines its utility, which may be limited by the weight of cargo, components, battery, and/or fuel. In addition, the range is limited for drones that need to travel both to a destination and back to a home base (i.e., a round-trip). While fixed wing UAV's tend to have improved range characteristics, finding a suitable landing and takeoff area and avoiding obstacles can be a challenge.

Conventional pitcheron aircraft use a pivotal wing assembly that pivots each wing separately along the wing's longitudinal axis. In this way, the wings provide the control surfaces for flight, rather than using ailerons. Thus, pitcheron aircraft do not use traditional ailerons, spoilers, or elevator control surfaces, which results in a sleek aerodynamic design. However, the ailerons, spoilers, and elevator control surfaces provide a braking function, which enables landing in a smaller area. Thus, conventional pitcheron aircraft tend to need longer areas (e.g., runways) for takeoff and landing.

SUMMARY

Various embodiments include a drone that may include a body having a longitudinal axis extending from a nose to a tail of the drone, a first wing pivotally controlled by a first motor to pivot about a wing pivot axis extending laterally from the longitudinal axis of the body, a second wing pivotally controlled by a second motor to pivot independent of the first wing, about the wing pivot axis, wherein pivotally controlling the first and second wings provides pitcheron control in flight, and a landing control device configured to rotate both the first and second wings, independent of the first and second motors, wherein rotating the first and second wings in flight causes the drone to enter a nose-down attitude in which pivotally controlling the first and second wings while the drone is in the nose-down attitude enables control of decent rate and lateral motion during an auto-rotation descent. In some embodiments, rotating both the first and second wings to an auto-rotation configuration may include rotating each of the first and second wings ninety degrees from a flight configuration. In some embodiments, pivotally controlling the first and second wings while the drone is in the nose-down attitude controls at least one of steering and a rate of descent of the drone.

Some embodiments may further include a sensor configured to detect obstacles while the drone is in the nose-down attitude. In some embodiments, the first and second wings are operatively coupled to the landing control device and may be removably secured to the landing control device.

Some embodiments may further include an power supply and a power level meter configured to detect when an onboard power level of the power supply may be below a power level threshold and trigger the landing control device to rotate both the first and second wings axis in response to the power level meter detecting that the power level may be below the power level threshold.

In some embodiments, the landing control device may be a landing carousel secured to the body of the drone, in which the landing carousel may include a pivotal frame configured to rotate about a carousel axis extending laterally relative to the longitudinal axis of the body. In such embodiments, the carousel axis may be offset from the wing pivot axis and disposed aft of a center of gravity of the drone. In such embodiments, the landing carousel may include a pair of laterally offset circular plates supporting the first and second motors.

In some embodiments, the landing control device may include a wing pivot rod projecting laterally from opposed sides of the body along the wing pivot axis. In such embodiments, the wing pivot rod projecting laterally from opposed sides of the body may be a continuous rod extending between the opposed sides of the body.

In some embodiments, a first wing control rod projecting laterally from the body and offset from the wing pivot axis may be configured to be moved by the first motor to provide pivotal control of the first wing.

Various embodiments include a landing carousel for a drone that may include a pivotal frame configured to be secured to a body of the drone and rotate relative to the body about a carousel axis extending laterally relative to a longitudinal axis of the body, wherein the pivotal frame pivotally supports a first wing on a first side of the body and a second wing on a second side of the body, opposed to the first side, a first wing motor configured to pivot the first wing of the drone about a wing pivot axis extending parallel to the carousel axis, and a second wing motor configured to pivot the second wing of the drone about the wing pivot axis independent of the pivot the first wing, wherein rotation of the pivotal frame relative to the body rotates both the first and second wings about the carousel axis independent of the pivot of the first and second wings. In some embodiments, the carousel axis may be offset from the wing pivot axis. In some embodiments, the carousel axis may be disposed aft of a center of gravity of the drone. In some embodiments, the pivotal frame may be configured to support the first and second wing motors. In some embodiments, the pivotal frame may include a pair of laterally offset circular plates configured to guide rotation of the pivotal frame relative to the body of the pivotal frame.

In some embodiments, the pivotal frame may include a wing pivot rod projecting laterally from opposed sides of the pivotal frame along the wing pivot axis. In such embodiments, the wing pivot rod projecting laterally from opposed sides of the body may be a continuous rod extending between the opposed sides of the body.

In some embodiments, the pivotal frame may include a first wing control rod projecting laterally from the body and offset from the wing pivot axis, in which the first wing control rod may be configured to be moved by the first wing motor to provide pivotal control of the first wing.

Some embodiments may further include a frame latch configured to hold the pivotal frame in a flight configuration for flying the drone, in which release of the frame latch enables rotation of the pivotal frame about the carousel axis in the nose-down attitude. In such embodiments, the frame latch may include a locking tab configured to rotate between a locking position that prevents rotation of the pivotal frame and an unlocked position that allows rotation of the pivotal frame. In such embodiments, the frame latch may include a locking tab configured to engage a catch on the body for preventing rotation of the pivotal frame.

Some embodiments may further include a lock release motor configured to maintain the frame latch in a locking position that prevents rotation of the pivotal frame, wherein deactivation of the lock release motor releases the frame latch. Some embodiments may further include an elastic device biasing rotation of the first and second wings, and a frame latch configured to counteract the biasing of the elastic device.

Some embodiments may include methods of landing a drone having a landing control device coupled to first and second wings that may include causing the landing control device to rotate causing the landing control device to rotate the first and second wings to cause the drone to enter a nose-down attitude, and collectively controlling the first and second wings while the drone is in the nose-down attitude to induce rotation about a long axis of a body of the drone and control a decent rate and lateral motion during an auto-rotation descent of the drone. In some embodiments, causing the landing control device to rotate both the first and second wings to an auto-rotation configuration may include rotating each of the first and second wings ninety degrees from a flight configuration. In some embodiments, collectively controlling the first and second wings while the drone is in the nose-down attitude controls at least one of steering and a rate of descent of the drone.

Some embodiments may include a drone including means for rotating both the first and second wings causing the landing control device to rotate to cause the drone to enter a nose-down attitude, and means for collectively controlling the first and second wings while the drone is in the nose-down attitude to induce rotation about a long axis of a body of the drone and control a decent rate and lateral motion during an auto-rotation descent of the drone.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
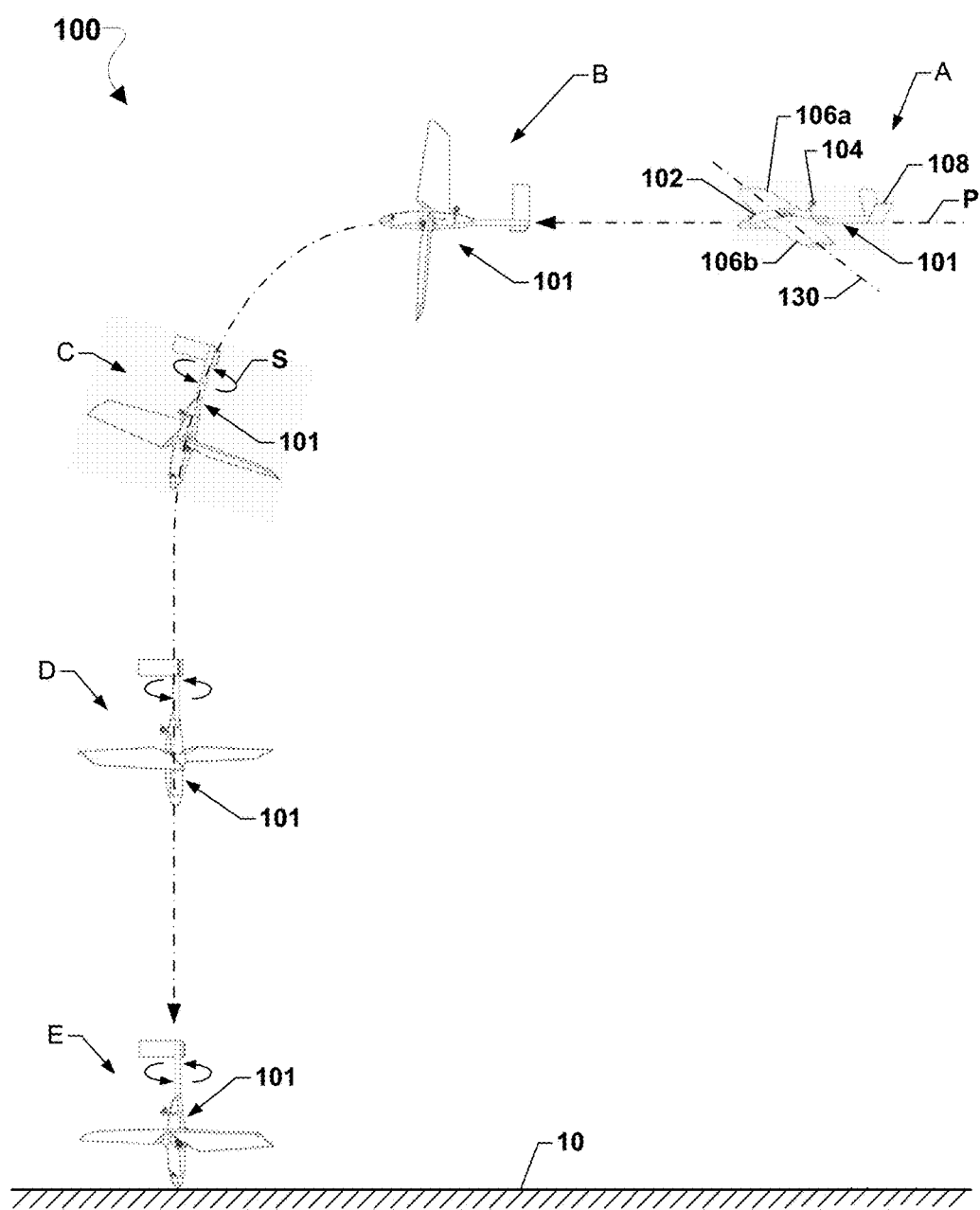
FIG. 1 is a schematic diagram of a mission environment suitable for use of various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments provide a drone that uses a pitcheron wing design with enhanced pivotal range, enabling the drone to land in an auto-rotation configuration. Various embodiments include a landing control device for use in a drone that enables pitcheron control of drone's wings in a flight mode and collective control of the wings in a nose-down auto-rotation configuration. In the auto-rotation configuration, the collective control by the landing control device enables maintaining a pitch differential between the pivotal wings to induce spinning motion (rapid roll) and results in the drone performing a controlled auto-rotation (i.e., spinning) descent that may include a flare for landing by varying the pitch of the wings just before impact. In various embodiments, the auto-rotation configuration may be triggered intentionally or as a failsafe for safely landing the drone. The auto-rotation configuration provided by the enhanced pivotal range may act like an integrated parachute system without the need for an actual parachute.

Various embodiments include a drone having a body with a longitudinal axis extending from a nose to a tail of the drone. The drone also has a landing control device for a pair of wings that are each pivotally controlled independently by motors configured to pivot the respective wings about a wing pivot axis. The wing pivot axis extends laterally and transverse to the longitudinal axis. The pivotal control of the individual wings provides pitcheron control in flight. The landing control device may be configured to collectively rotate both the wings, independent of the motors controlling the pivotal movement of the wings. Collectively rotating the wings in flight causes the drone to enter a nose-down attitude. In addition, pivotally controlling the first and second wings while the drone is in the nose-down attitude enables control of the decent rate and lateral motion during an auto-rotation descent.

In various embodiments, the landing control device may be a landing carousel configured to pivotally support first and second wings. The landing carousel may be secured to a body of the drone and may include a pivotal frame configured to rotate about a carousel axis extending laterally relative to the longitudinal axis of the body. The first and second wings may be pivotally supported by the landing carousel. In particular, the first wing may be configured to pivot about a wing pivot axis extending parallel to the carousel axis. Similarly, the second wing may also be pivotally supported by the landing carousel and configured to pivot, separate from the first wing, about the wing pivot axis. The rotation of the pivotal frame relative to the body rotates both the first and second wings about the carousel axis. Pivoting the first and second wings about the wing pivot axis in the flight configuration provides pitcheron control. Pivoting the first and second wings about the carousel axis in the auto-rotation configuration may be used to land the drone using auto-rotation. Thus, the landing carousel may rotate from a flight configuration, for flying the drone using pitcheron control, to an auto-rotation configuration for descending and landing the drone using a controlled auto-rotation.

As used herein, the terms "drone" or "spin-landing drone" are used interchangeably to refer to an unmanned aerial vehicle (UAV) that may benefit from various embodiments. The particular drones described with respect to various embodiments is for purposes of describing problems addressed and technical solutions provided by the claims and/or the various embodiments, and is not intended to limit the scope of the claims unless specifically recited in claim elements. A drone may be any one of various types of vehicles that include an onboard computing device with a processor configured to provide some autonomous or semi-autonomous capabilities. In various embodiments, the drone may be autonomous, such that the drone may include an onboard computing device configured to maneuver and/or navigate the drone without remote operating instructions (i.e., autonomously), such as from a human operator (e.g., via a remote computing device). In various embodiments, the drone may be semi-autonomous, such that the drone may include an onboard computing device configured to receive some information or instructions, such as from a human operator (e.g., via a remote computing device), and autonomously maneuver and/or navigate the drone consistent with the received information or instructions. In addition, a drone may be propelled for flight using one or more propulsion units, each including one or more rotors, that provide propulsion and/or lifting forces for the drone.

As used herein, the term "pitcheron" refer to a pivotal wing assembly of a drone, in which each wing separately pivots along each wing's longitudinal axis to provide control, rather than using elevator or aileron control surfaces. In this way, the overall surface area of each wing provides the control surfaces for flight. A separate servo controls each wing separately to achieve pitch and roll control by rotating each wing individually about a pivot axis that is parallel to the longitudinal axis of the wings. As used herein, the term "pitcheron control" refers to the use of a pivotal wing assembly to control the roll and/or pitch of a drone. A drone using pitcheron control may also be considered a wingeron aircraft in that the wings pivot in an opposing manner to provide for roll control. Thus, a drone using pitcheron control need not include traditional aileron and elevator control surfaces.

As used herein, the term "computing device" refers to an electronic device equipped with at least a processor. Examples of computing devices include processors within a controller and the drone control system and/or mission management computer that are onboard the drone, as well as remote computing devices communicating with the drone configured to perform operations of the various embodiments. Computing devices implemented in base stations or other structures may include wireless communication devices (e.g., cellular telephones, wearable devices, smartphones, web-pads, tablet computers, Internet enabled cellular telephones, Wi-Fi® enabled electronic devices, personal data assistants (PDAs), laptop computers, etc.), personal computers, and servers. In various embodiments, computing devices may be configured with memory and/or storage. Additionally, computing devices referred to in the various example embodiments may be coupled to or include wireless communication capabilities implementing various embodiments, such as network transceiver(s) and antenna(s) configured to establish a local area network (LAN) connection (e.g., Wi-Fi® transceivers).

Various embodiments may be implemented in a drone operating within a mission environment, an example of which is illustrated in FIG. 1. The example mission environment 100 includes a drone 101 traversing a path P, at five different positions (e.g., A, B, C, D, E), including a touch-down position E, to illustrate how a drone may operate to improve the range of the drone and increase the suitable landing sites available to the drone.

The drone 101 implementing various embodiments may be a configured for extended horizontal flight. In particular, the drone 101 may include a body 102, which forms the main body of the drone and provides a central structure that supports a rotor 104 (i.e., a driven propeller providing propulsion), a first wing 106a, a second wing 106b, a tail 108, and other components of the drone 101. The tail 108 may include two fixed stabilization surfaces in the shape of a V. Alternatively, the drone 101 may include conventional horizontal and vertical stabilizers at the tail end of the drone 101.

The first and second wings 106a, 106b are each pivotal wing assemblies (i.e., pitcheron wings) that provide lift and stabilized flight controls during flight. A landing control device, secured to the body 102, pivotally supports each of the first and second wings 106a, 106b, enabling pivotal movement about a wing pivot axis 130 that extends lengthwise across the first and second wings 106a, 106b (i.e., perpendicular to the longitudinal axis of the body). The pivotal support may allow internal motors to separately control the pivotal movement of each of the first and second wings 106a, 106b about the wing pivot axis 130 for providing pitcheron control. In addition, the landing control device may be configured to collectively rotate the first and second wings 106a, 106b independent of motor-driven pivotal movement of the first and second wings 106a, 106b. In this way, the landing control device may rotate the first and second wings 106a, 106b from a flight configuration to an auto-rotation configuration. The auto-rotation configuration will induce the drone 101 to enter a nose-down attitude. In addition, by maintaining a pitch differential between the first and second wings 106a, 106b, the drone will spin during a nose-down descent. The pivotal control of the first and second wings while the drone 101 is in the nose-down attitude may provide lift and yaw control during an auto-rotation descent that enables the drone 101 to be controlled both in rate of descent and direction of travel.

The drone 101 and the various elements thereof may be made out of plastic, metal, other suitable materials, or any combination thereof. For ease of description and illustration, some detailed aspects of the drone 101 are omitted such as a power source, wiring, frame structure, interconnects, or other features that would be known to one of skill in the art.

As shown in FIG. 1, at position A along the path P, the drone 101 has the landing control device in a flight configuration and is flying in level (i.e., horizontally). In the flight configuration, the internal motors may individually pivot the first and second wings 106a, 106b, separately, about the wing pivot axis 130 to provide pitcheron control (i.e., pitch and/or roll) for navigational flight.

The landing control device, supporting the first and second wings 106a, 106b, may be maintained in the flight configuration until time for or conditions warrant a nose-down landing by the drone using the auto-rotation configuration. The auto-rotation configuration may be used for emergency landings and non-emergency landings.

The drone 101 may be configured with one or more processing devices configured to control and navigate the drone 101, such as by controlling the flight motors and the first and second wings 106a, 106b to maintain stable flight along a flight path. The drone 101 may be configured with communication components that enable the drone 101 to receive position information and information from external systems including servers, access points, other drones, and so on. The position information may be associated with the current position of the drone 101, waypoints, flight paths, avoidance paths/sites, altitudes, destination sites, locations of known or potential charging/refueling sites, and/or the relative locations of other drones.

A decision may be made by a processing device to land the drone 101 in response to determining that the drone 101 has reached a destination. Alternatively, the decision to land may be made in response to determining that the drone should land immediately due to a condition endangering flight, such a power source (e.g., a battery) has been exhausted. For example, a decision to land may be made by the processing device in response to determining that a state of charge of a main power battery has reached a threshold state below which it is not advisable to continue operating the drone 101. As further examples, a decision to land may be made by the processing device in response to a preset level of power, a level of stored energy adjusted according to current conditions, a level of stored energy set by command signals from a remote source, or a combination thereof. For example, a decision to land may be made by the processing device when the 5 battery charge state reaches 5% to 10% of the full charge state. Whether the battery charge state safety threshold is 5%, 10%, some percentage in between, or some other percentage may be determined based on a level of caution desired for operating the drone 101, which may depend on the current mission, a payload, a pilot or controller preference, a current location of the drone 101, etc.

In some embodiments, the drone 101 may use an extended flight protocol that lets the drone 101 fly until a zero level or near zero level of stored energy in the battery is reached. In this flight protocol, the drone 101 may be permitted to continue flying until the battery completely or almost completely runs out of stored energy, relying on the auto-rotation recovery capability to safely return the drone to the ground. A drone 101 using the extended flight protocol may thus be permitted to continue flying while the state of the battery is well below minimum threshold in order to extend the range or time aloft of the drone 101. Using the extended flight protocol, the drone 101 may remain aloft and/or travel a fullest extent possible using the onboard battery or other available onboard power supply and/or source(s) (e.g., solar).

In various embodiments when operating using the extended flight protocol, the state of a power supply, such as an onboard battery of the drone 101, may continue to be monitored to enable the drone 101 to activate the auto-rotation configuration when an emergency-landing state is reached. The emergency-landing state may occur when a second power level threshold of battery charge that has been reached below which the auto-rotation configuration should be triggered. Like the warning state described above, the emergency-landing state may be a preset level of power, a level of stored energy adjusted according to current conditions, a level of stored energy set by command signals from a remote source, or a combination thereof. For example, the emergency-landing state may correspond to a 0% to 1% battery charge state. In response to the processing device determining the emergency-landing state is reached, the drone 101 may activate the auto-rotation configuration. Alternatively using the extended flight protocol, the state of the power supply of the drone 101 need not be monitored for activating the auto-rotation configuration. The battery may be allowed to discharged, thus triggering an automatic switch (i.e., not requiring a command from the processor) to the auto-rotation configuration.

At position B, the drone 101 has switched from the flight configuration to the auto-rotation configuration. To switch to the auto-rotation configuration, the landing control device rotates a leading edge of both the first and second wings 106a, 106b upwardly with respect to the direction of flight. For example, in the auto-rotation configuration, the landing control device may rotate the first and second wings 106a, 106b ninety degrees (90°). In the auto-rotation configuration, the first and second wings 106a, 106b will no longer generate the lift needed for level flight and, with the drone 101 being slightly nose-heavy (i.e., a forward portion of the drone 101 being weighted more heavily than the rear), the drone 101 pitch over into a nose-down attitude, as shown at position C.

In the auto-rotation configuration, the first and second wings 106a, 106b may be angled at opposite pitches to induce the drone 101 to begin rotating about the long axis. Any significant differential pitch angle between the first and second wings 106a, 106b will tend to cause the drone 101 to spin (indicated by S).

As shown at position D, in the auto-rotation configuration the drone 101 spins about the longitudinal axis of the drone 101, which causes the first and second wings 106a, 106b to generate lift, which slows the rate of descent. While the landing control device maintains the first and second wings 106a, 106b fixed in the auto-rotation configuration, the internal motors may individually pivot the first and second wings 106a, 106b separately about the wing pivot axis 130 to control an angle of attack of each wing, which affects the rate of descent and the spin rate about the longitudinal access. The internal motors may also individually pivot the first and second wings 106a, 106b separately in the manner of a collective similar helicopter to enable pitch control. In this manner, during the spinning nose-down descent, the pivotal control of the first and second wings provides control during the auto-rotation descent of both the rate of descent and a flight path towards the ground.

Thus, similar to how the variable pitch in a helicopter's rotor blades may be used to control an emergency descent using auto-rotation, the drone 101 may use the pivotal control of the first and second wings 106a, 106b to control the spinning nose-down descent. Unlike a helicopter, however, the body 102 (i.e., the main body) of the drone 101 rotates along with the first and second wings 106a, 106b, more like a maple-leaf pod falling from a tree. During the spinning nose-down descent, the drone 101 spins by the forces caused by the first and second wings 106a, 106b moving through the air without the need for engine power. Once the drone 101 is in the spinning nose-down descent, the pitcheron controls used for normal flight may be operated to control the pivot of the first and second wings 106a, 106b separately in the manner of a helicopter collective to pitch the body in a desired direction of travel. During a spinning nose-down descent, the more the first and second wings 106a, 106b are oriented horizontally (i.e., the chord lines of the first and second wings 106a, 106b perpendicular to the direction of descent), the slower the rate of descent, and the less the first and second wings 106a, 106b are oriented horizontally, the faster the rate of descent.

The kinetic energy from the spinning nose-down descent may be used in a flare maneuver in which the first and second wings 106a, 106b are oriented more horizontally just before reaching the ground 10 in order to generate greater lift to slow the descent of the drone 101 enough to provide a soft nose-down ground impact, as shown at position E. After the drone 101 has touched-down on the ground 10, the drone fall to one side to complete the landing.

During the nose-down descent, the drone 101 may use a camera or other sensor(s) in the nose to monitor for obstacles (e.g., trees, power lines, etc.) to be avoided and/or suitable landing spots. The nose camera or other sensor may also be used to determine the rate of rotation (e.g., 1-2 rpms). The information received from the nose camera or other sensor may be used for navigation while the collective control of the first and second wings 106*a*, 106*b* is used to fly the drone 101 around obstacles and toward a particular landing spot.

Figure 2A:
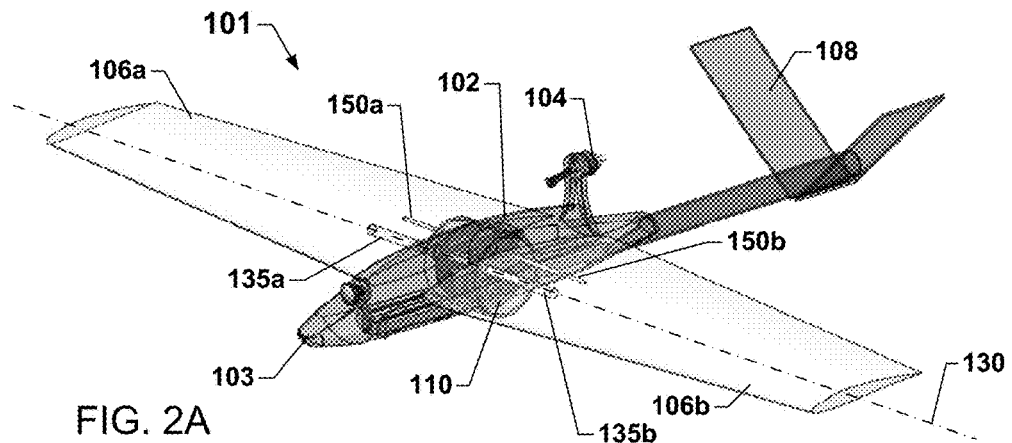
FIG. 2A is a perspective translucent view illustrating a drone in a flight configuration with the wings level according to various embodiments.
Figure 2B:
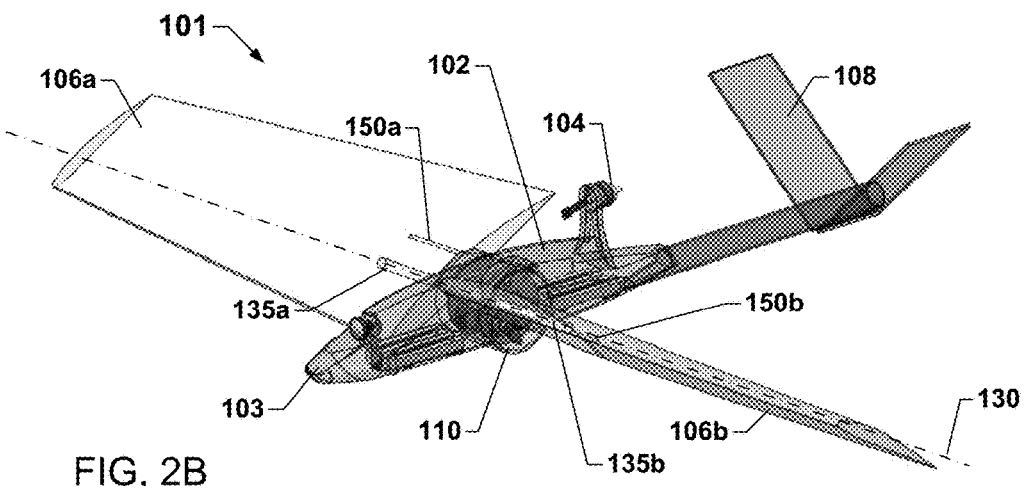
FIG. 2B is a perspective translucent view illustrating a drone in a flight configuration with a pitch differential between the wings according to various embodiments.
Figure 2C:
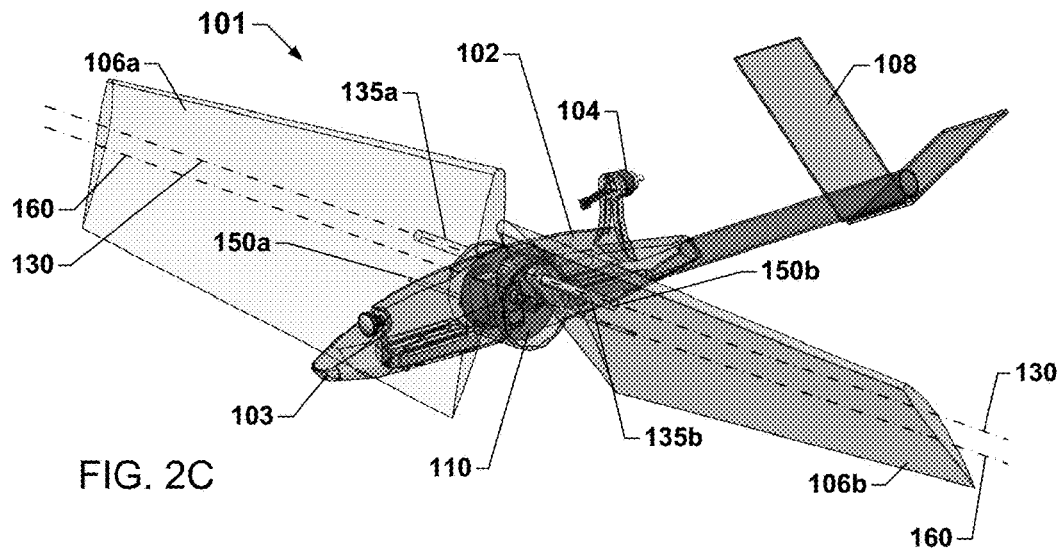
FIG. 2C is a perspective translucent view illustrating a drone in an auto-rotation configuration according to various embodiments.

Various embodiments may be implemented within a variety of drones configured to operate in a flight configuration and an auto-rotation configuration, an example of which suitable for use with various embodiments is illustrated in FIGS. 2A-2C. With reference to FIGS. 1-2C, the drone 101 includes the first and second wings 106*a*, 106*b* that are individually controlled to pivot about the wing pivot axis 130 that extends laterally from and perpendicular to a longitudinal axis of the body 102 of the drone 101 that extends from the nose 103 to the tail 108. In addition, the drone 101 includes a landing control device 110 configured to collectively rotate both the first and second wings 106*a*, 106*b* independent of pivoting (i.e., pitcheron) movements.

In various embodiments, the drone 101 may include the rotor 104 that provides propulsion. Although the rotor 104 is illustrated as a single rotor mounted on a stanchion projecting vertically from the body 102, the drone may include additional rotors and/or the rotor 104 may mounted on a different part of the drone 101 (e.g., on or near the tail 108).

In various embodiments, the landing control device 110 may include a first wing pivot rod 135*a* and a second wing pivot rod 135*b* projecting laterally from opposed sides of the body 102 along the wing pivot axis 130. The first and second wing pivot rods 135*a*, 135*b* may be carbon (or other suitable material) rods configured to receive the first and second wings 106*a*, 106*b*, respectively, pivotally mounted thereon. The first and second wing pivot rods 135*a*, 135*b* may be a single a continuous rod extending through and between the opposed sides of the body 102. The first and second wings 106*a*, 106*b* may be configured to be easily mounted on and/or removed from the first and second wing pivot rods 135*a*, 135*b*, such as with set screws. Thus, the first and second wings 106*a*, 106*b* may include slots for receiving the first and second wing pivot rods 135*a*, 135*b*.

The drone 101 may be a partially disposable aircraft. In particular, the first and second wings 106*a*, 106*b* may be designed for very limited or single use (i.e., disposable), such as for a single one-way trip. For example, the first and second wings 106*a*, 106*b* may be made of solid foam without sheeting, paper, light weight wood, plastic, or the like, which may likely break during landing. A recipient of the drone 101 (i.e., recovering the drone 101 after landing) may be expected to return the drone 101 to the sender by other means, such as through the mail or by delivering the remaining portions of the drone 101 (e.g., without the wings) at a designated location. Alternatively, the wings may be returned along with the rest of the drone 101, but may require a smaller shipping container since the wings may be removed.

In various embodiments, the landing control device 110 may also support a first wing control rod 150*a* and a second wing control rod 150*b* projecting laterally from opposed sides of the body 102 and offset from the wing pivot axis 130. The first and second wing control rods 150*a*, 150*b* may be configured to be moved by internal motors of the drone 101 to provide pivotal control of the first and second wings 106*a*, 106*b*, respectively. Like the first and second wing pivot rods 135*a*, 135*b*, the first and second wing control rods 150*a*, 150*b* may be configured to receive the first and second wings 106*a*, 106*b*, respectively, either pivotally or fixedly mounted thereon. The internal motors of the drone 101 may control gears or other servo-mechanisms that move the first and second wing control rods 150*a*, 150*b* up and down. The up and/or down movement of the first and second wing control rods 150*a*, 150*b* may in-turn pivot the first and second wings 106*a*, 106*b* about the wing pivot axis 130. In this way, the movement of the first and second wing control rods 150*a*, 150*b* may provide the pitcheron control of the drone 101.

FIG. 2A illustrates the first and second wings 106*a*, 106*b* in the flight configuration for flying the drone using pitcheron control. In this figure, the first and second wings 106*a*, 106*b* are both set at the same or roughly the same pitch angle suitable for level or straight flight.

FIG. 2B illustrates the first and second wings 106*a*, 106*b* still in the flight configuration, but pivoted about the wing pivot axis 130. In particular, a leading edge of the first wing 106*a* has been pivoted downwardly and a leading edge of the second wing 106*b* has been pivoted upwardly. Since the landing control device and the first and second wings 106*a*, 106*b* are in the flight configuration, the pivot shown in FIG. 2B should induce a rolling maneuver, with the first wing 106*a* rolling downwardly and the second wing 106*b* rolling upwardly (i.e., a clockwise roll from a forward looking perspective on the drone 101).

In various embodiments, the landing control device 110 may include a pivotal frame configured to rotate around a carousel axis 160 that is parallel to the wing pivot axis 130. Rotation of the pivotal frame also rotates the first and second wings 106*a*, 106*b* around the carousel axis 160. The carousel axis 160 may be offset from of the wing pivot axis 130, such as being offset in the aft direction along the longitudinal axis of the drone 101 as shown in FIG. 2C. Alternatively, the wing pivot axis 130 may be coincident with the carousel axis 160 and/or offset vertically (i.e., offset from the longitudinal axis).

FIG. 2C illustrates the first and second wings 106*a*, 106*b* in the auto-rotation configuration for performing a controlled descent using auto-rotation. In FIG. 2C, the landing control device 110 has rotated the first and second wings 106*a*, 106*b*, independent of the internal motors used to control the pivotal movement of the first and second wings 106*a*, 106*b*. In particular, the landing control device 110 has collectively rotated both the first and second wings 106*a*, 106*b* ninety degrees from the flight configuration to the auto-rotation configuration for landing the drone 101.

The wing pivot axis 130 may generally be located approximately one-third of the way aft of the wing leading edges, along a chord line of each wing, which may correspond to a longitudinal center of gravity of the drone 101. In contrast, the carousel axis 160 may be disposed aft of the wing pivot axis 130. With the carousel axis 160 disposed aft of the center of gravity of the drone 101, when the first and second wings 106*a*, 106*b* rotate about the carousel axis 160, the longitudinal center of gravity of the drone 101 is forward of the carousel axis 160. This makes the drone 101 more nose heavy when in the auto-rotation configuration, and thus prone to entering the nose-down attitude of the auto-rotation configuration. Alternatively, the wing pivot axis 130 may be coincident with the carousel axis 160, but to ensure the drone 101 is encouraged to enter a nose-down attitude in the auto-rotation configuration, the wing pivot axis 130 may disposed just slightly behind a center of gravity position along the longitudinal axis of the drone 101.

Figure 3A:
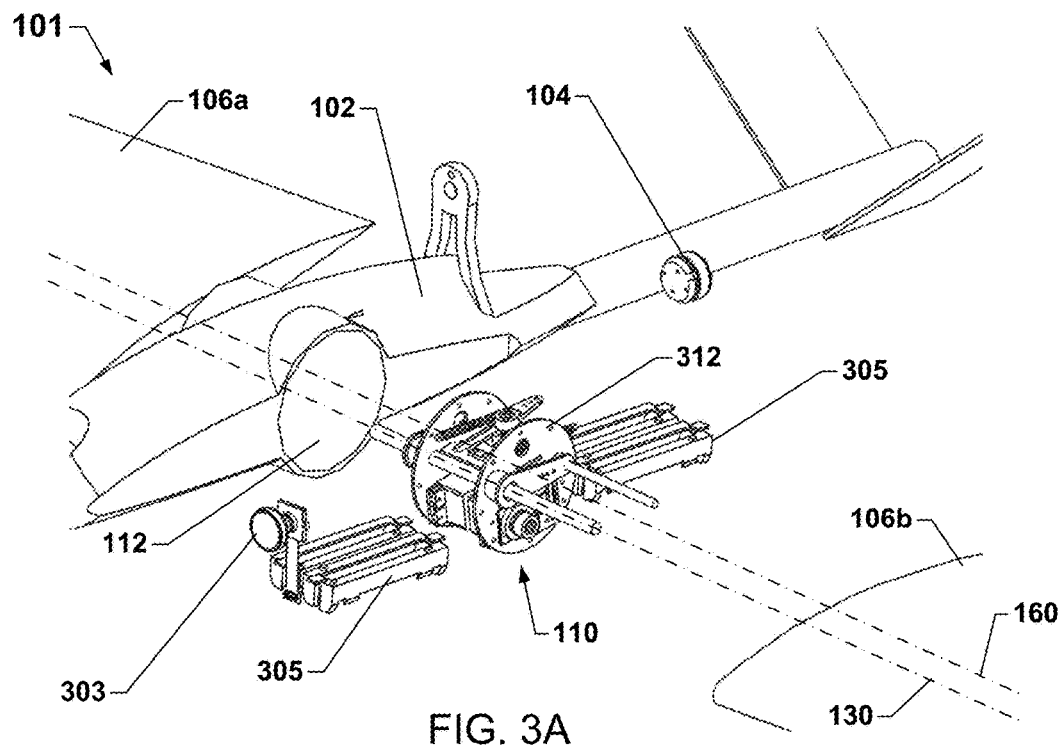
FIG. 3A is an exploded perspective view of a drone in level flight and in a flight configuration according to various embodiments.
Figure 3B:
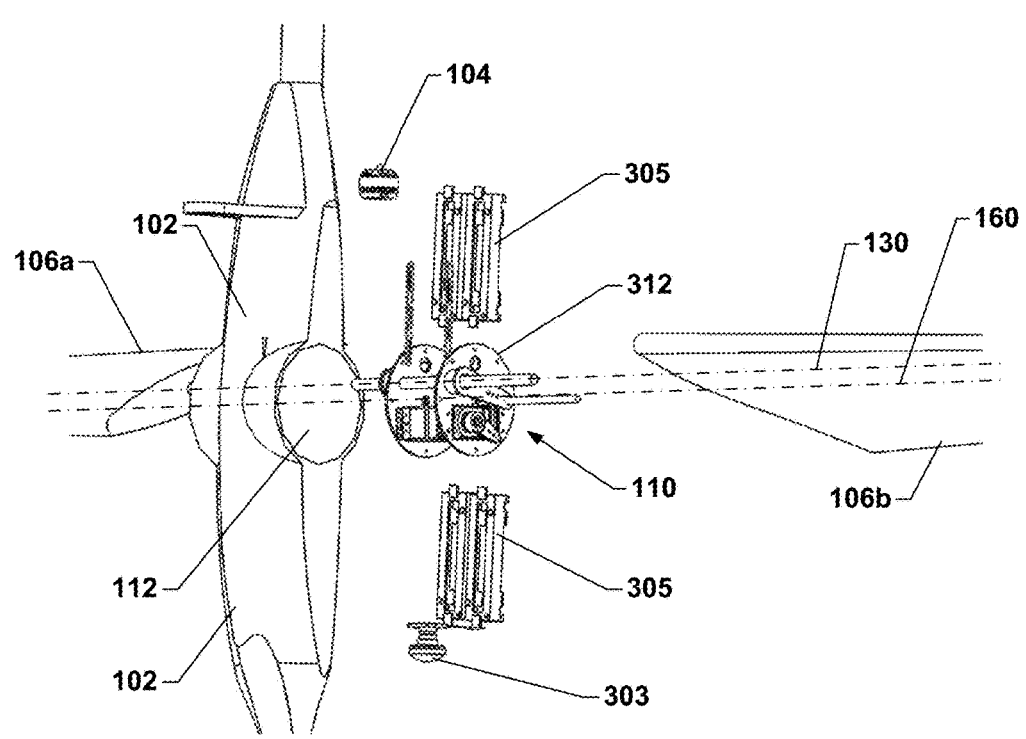
FIG. 3B is an exploded perspective view of a drone in a nose-down attitude and in an auto-rotation configuration according to various embodiments.

An example of a landing control device 110 suitable for use with various embodiments is illustrated in FIGS. 3A and 3B, which are partially exploded views of the drone 101. With reference to FIGS. 1-3B, the landing control device 110 may be formed as a landing carousel that is configured to rotate about the carousel axis 160 extending laterally relative to the longitudinal axis and secures to the body 102 of the drone 101.

The landing control device 110 may include a pivotal frame 312 that holds the components of the landing control device 110 and is configured to rotate about the carousel axis 160, which extends laterally relative to the longitudinal axis of the drone 101. At least a central section of the landing control device 110 may be configured to sit inside a carousel recess 112 built into the body 102. The carousel recess 112 may be a cylindrical shaped recess sized to loosely receive the landing control device 110 therein, such that at least the central portion of the landing control device 110 may freely rotate inside the carousel recess 112. The pivotal frame 312 may include a pair of laterally offset circular plates supporting the components of the landing control device. The circular plates may straddle opposed sides of the body 102, just outside the carousel recess 112, thus holding the pivotal frame 312 in the carousel recess 112. In addition, the body 102 may have a guide recess, just outside the carousel recess 112, configured to receive the outer perimeters of the offset circular plates. In addition, the guide recess may constrain rotational movement of the circular plates during rotation of the pivotal frame 312.

Thus, the carousel axis 160 may coincide with a central laterally extending axis of the carousel recess 112. The carousel recess 112 may extend laterally through the body 102, forming apertures on opposed sides of the body. When the landing control device 110 is mounted in the carousel recess 112, the first and second wings 106a, 106b may be mounted on opposed sides of the landing control device 110.

FIG. 3A illustrates how in the flight configuration the wing pivot axis 130 may be disposed in a first relative position, slightly forward of the carousel axis 160 (along the longitudinal axis of the drone 101). FIG. 3B illustrates how upon rotation of the landing control device 110 into the auto-rotation configuration the wing pivot axis 130 will have rotated to a second relative position. The second relative position may be approximately ninety degrees (90°) from the first relative position. The relative rotation of the landing control device 110 should be measured relative to the body 102. In FIG. 3A the body 102 is in a generally horizontal attitude of the flight configuration. However, in FIG. 3B the body 102 is in the nose-down attitude of the auto-rotation configuration. In the auto-rotation configuration, the first and second wings 106a, 106b pitch upwardly, relative to the body 102, enough to induce the drone 101 to enter a nose-down attitude. By ensuring a pitch differential between the first and second wings 106a, 106b in the auto-rotation configuration, the drone 101 will spin about the longitudinal axis to enable a controlled descent and landing using auto-rotation.

The body 102 may also hold additional drone components, such as a sensor 303 configured to detect obstacles while the drone 101 is in the nose-down attitude. The sensor 303 may scan ahead of the drone 101. For example, the sensor 303 may be a camera or laser-radar used during and auto-rotation descent to visualize or otherwise scan the ground or other terrain below. The sensor 303 may thus be used as an aid to navigating the drone 101 while the collective control enabled by the landing control device 110 enables control of at least one of the steering, rate of descent, and flare of the drone. In this way, the sensor 303 may be used to guide the drone 101 to a safe landing.

Additionally, the body 102 may hold at least one power supply 305 and a power level meter configured to detect when an power level of the power supply is below a power level threshold (e.g., less than 1% power remaining). The landing control device 110 may be triggered to collectively rotate both the first and second wings 106a, 106b around the axis carousel axis 160 in response to the power level meter detecting that the power level is below the power level threshold.

Figure 4A:
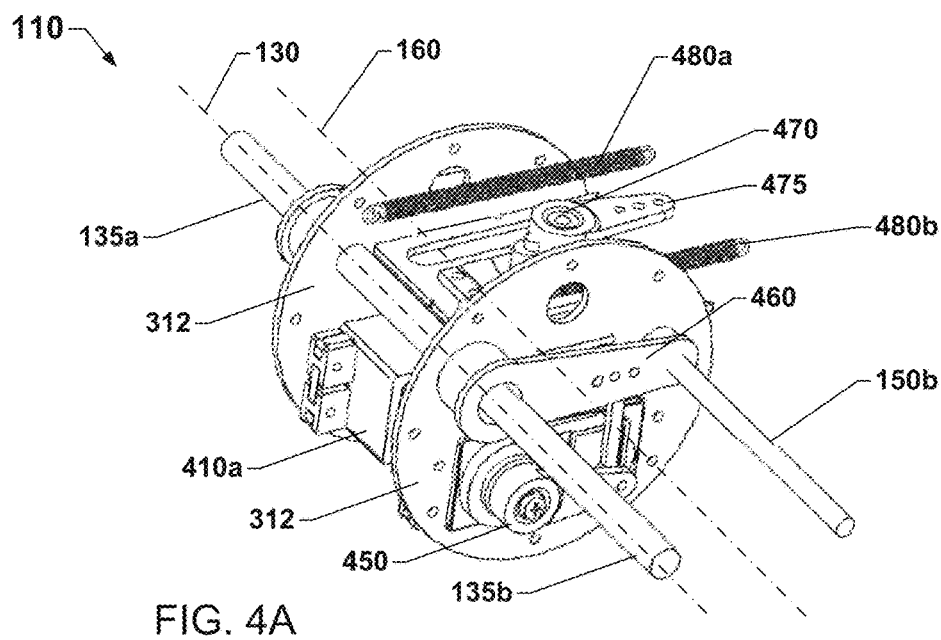
FIG. 4A is a perspective view illustrating a landing control device in a flight configuration according to various embodiments.
Figure 4B:
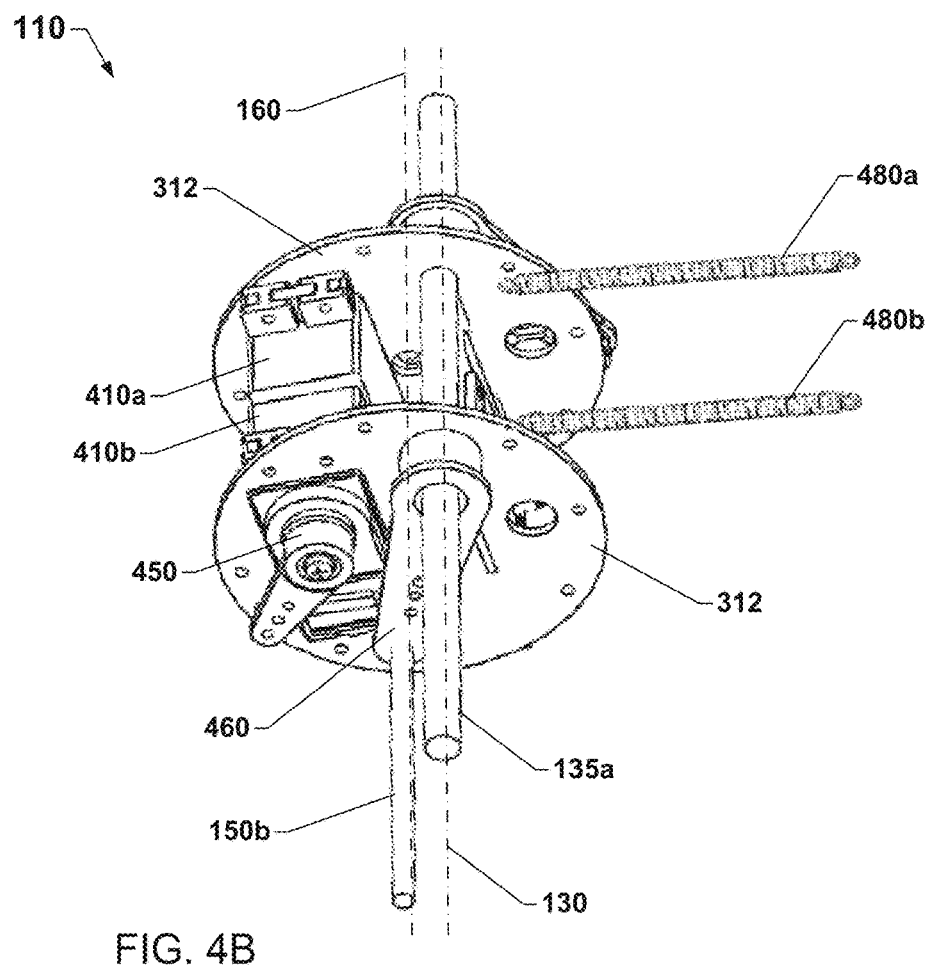
FIG. 4B is a perspective view illustrating a landing control device in an auto-rotation configuration according to various embodiments.

More details regarding the landing control device 110 are illustrated in FIGS. 4A-4B. With reference to FIGS. 1-4B, the landing control device 110 may be a modular unit, holding various components that rotate along with the pivotal frame 312.

The pivotal frame 312 may hold first and second motors 410a, 410b, as well as additional gears, arms, rods, etc. used for pitcheron control. For example, each of the first and second motors 410a, 410b may drive a pivot guide arm 450 that drives a wing control arm 460, which in-turn moves a respective one of the first and second win control rods 150a, 150b. A first end (toward the left in FIG. 4A) of the pivot guide arm 450 may rotate around an axis of a respective one of the first and second motors 410a, 410b, while a second end of the pivot guide arm 450 pivots accordingly. The second end (toward the right in FIG. 4A) of the pivot guide arm 450 may be linked to a second end of the wing control arm 460 (also toward the right in FIG. 4A). A first end of the wing control arm 460 may be pivotally supported by a respective one of the first and second wing pivot rods 135a, 135b. Thus, activation of each of the first and second motors 410a, 410b may move the respective first and second wing pivot rods 135a, 135b to provide pitcheron control.

The pivotal frame 312 may also hold a lock release motor 470 configured to control the collective rotation of the first and second wings (e.g., 106a, 106b). The lock release motor 470 may actively prevent the landing control device 110 from rotating within the body and thus prevent the first and second wings from rotating. For example, a locking tab 475 pivotally controlled by the lock release motor 470 may project from the landing control device 110 to wedge into a portion of the body for preventing relative rotation between the landing control device 110 and the body. The lock release motor 470 may control pivotal movement of the locking tab 475 in order to free the locking tab 475 from the body to trigger the collective rotation of the first and second wings.

The landing control device 110 may also include first and second return springs 480a, 480b. The first and second return springs 480a, 480b or similar elastic device may bias the pivotal frame 312 to rotate from the flight configuration to the auto-rotation configuration. For example, in the flight configuration shown in FIG. 4A, the first and second return springs 480a, 480b may be stretched to provide a desired biasing force to rotate the pivotal frame 312 clockwise in the orientation shown. In the auto-rotation configuration shown in FIG. 4B, the first and second return springs 480a, 480b may be less stretched, but still under slight tension in order to ensure the pivotal frame 312 remains firmly in the auto-rotation configuration.

In various embodiments, the landing control device 110 may also hold a processing unit or even the main processor of the drone. Such a processing unit may control the first and second motors 410a, 410b and/or the lock release motor 470.

Figure 5:
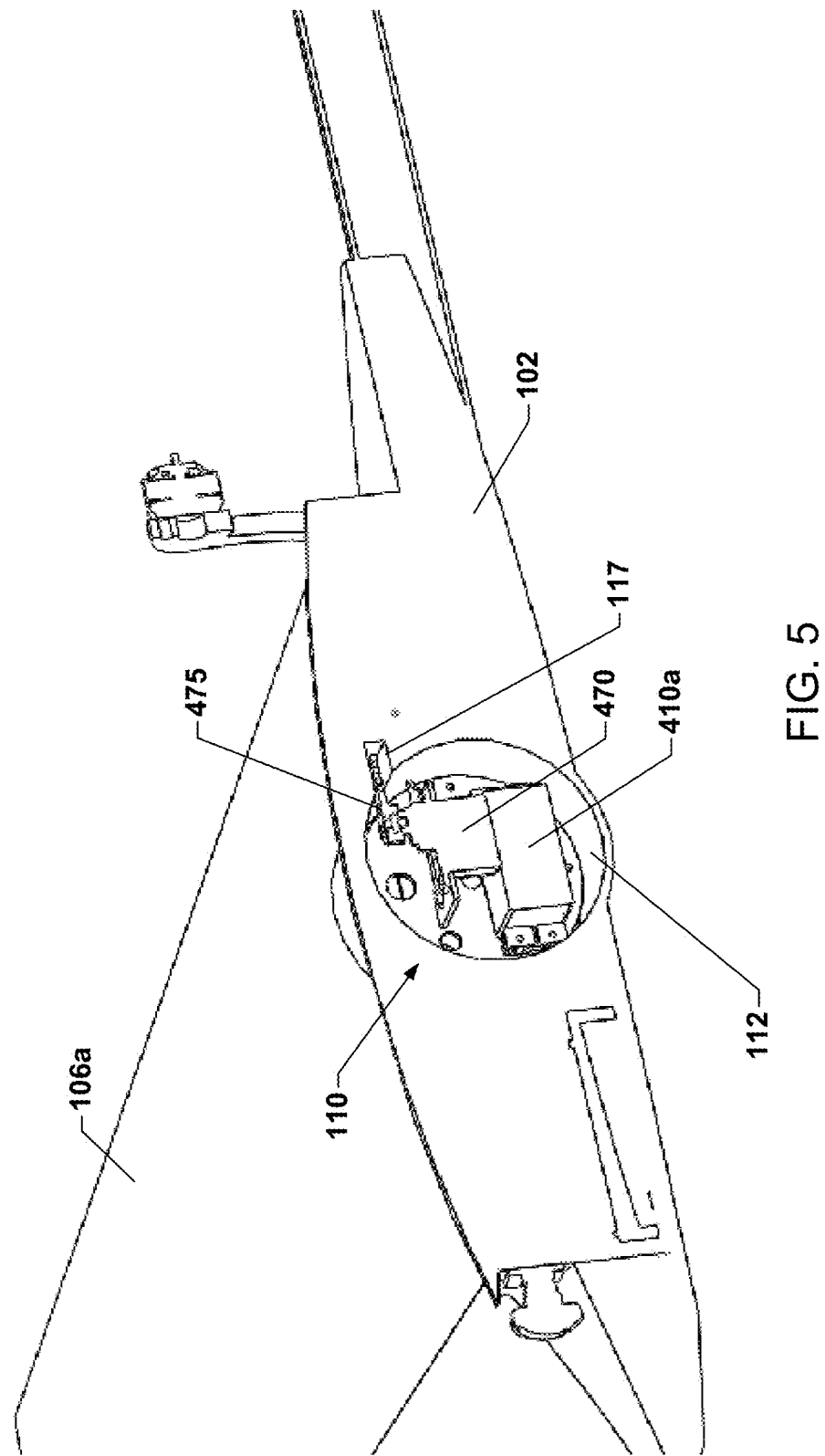
FIG. 5 is a perspective cross-sectional view of a drone with a frame latch of a landing control device locked to a body of the drone, according to various embodiments.

Various embodiments may be implemented within a variety of landing control devices for a drone to operate in a flight configuration and an auto-rotation configuration, an example of which suitable for use with various embodiments is illustrated in FIG. 5. With reference to FIGS. 1-5, the landing control device 110 may include a frame latch configured to hold the landing control device in a flight configuration for flying the drone. The frame latch may include the locking tab 475, which is received within a fuselage catch 117. The fuselage catch 117 may be a recess or stop tab within the fuselage 102 that receives and holds the locking tab 475. Pivoting or retracting the locking tab from the fuselage catch 117 may release of the frame latch enabling the collective rotation of the first and second wings (e.g., 106a, 106b) into a nose-down configuration for the auto-rotation descent control. For example, locking tab 475 may be configured to rotate between a locking position that prevents the collective rotation of the wings (i.e., maintains the flight configuration) and an unlocked position that allows the collective rotation of the wings (i.e., triggers the auto-rotation configuration). Alternatively, the frame latch may include a release pin configured to hold the landing control device 110 in the flight configuration and a movement of the release pin frees the landing control device 110 to pivot about the wings (i.e., switch to the auto-rotation configuration).

In some embodiments, the landing control device 110 may include a lock release motor 470 that is separate from the first and second motors (e.g., 410a, 410b) providing the pitcheron control. The lock release motor 470 may be configured to control the collective rotation of the first and second wings by controlling the release of the frame latch. Thus, the lock release motor 470 may be used to control the switch from the flight configuration to the auto-rotation configuration. For example, when power is applied to the lock release motor 470 (e.g., 5 volts), the locking tab 475 may be actively held in the fuselage catch 117 to prevent the landing control device from collectively rotating the wings. In this way, the lock release motor 470 may apply enough torque to counter-act as a spring continuously biasing the locking tab 475 toward a release position. Thus, when power is cut-off from the lock release motor 470, the locking tab 475 may pivot or retract out of the fuselage catch 117 and release the collective rotate of the first and second wings. In this way, the auto-rotation configuration may be triggered in response to insufficient power being supplied to the lock release motor 470.

In some embodiments, a pilot, technician, or other user may initially locked or set the frame latch in the flight configuration so the drone may be launched. Thereafter, at an appropriate time, the drone 101 may switch to the auto-rotation configuration when applicable.

Figure 6:
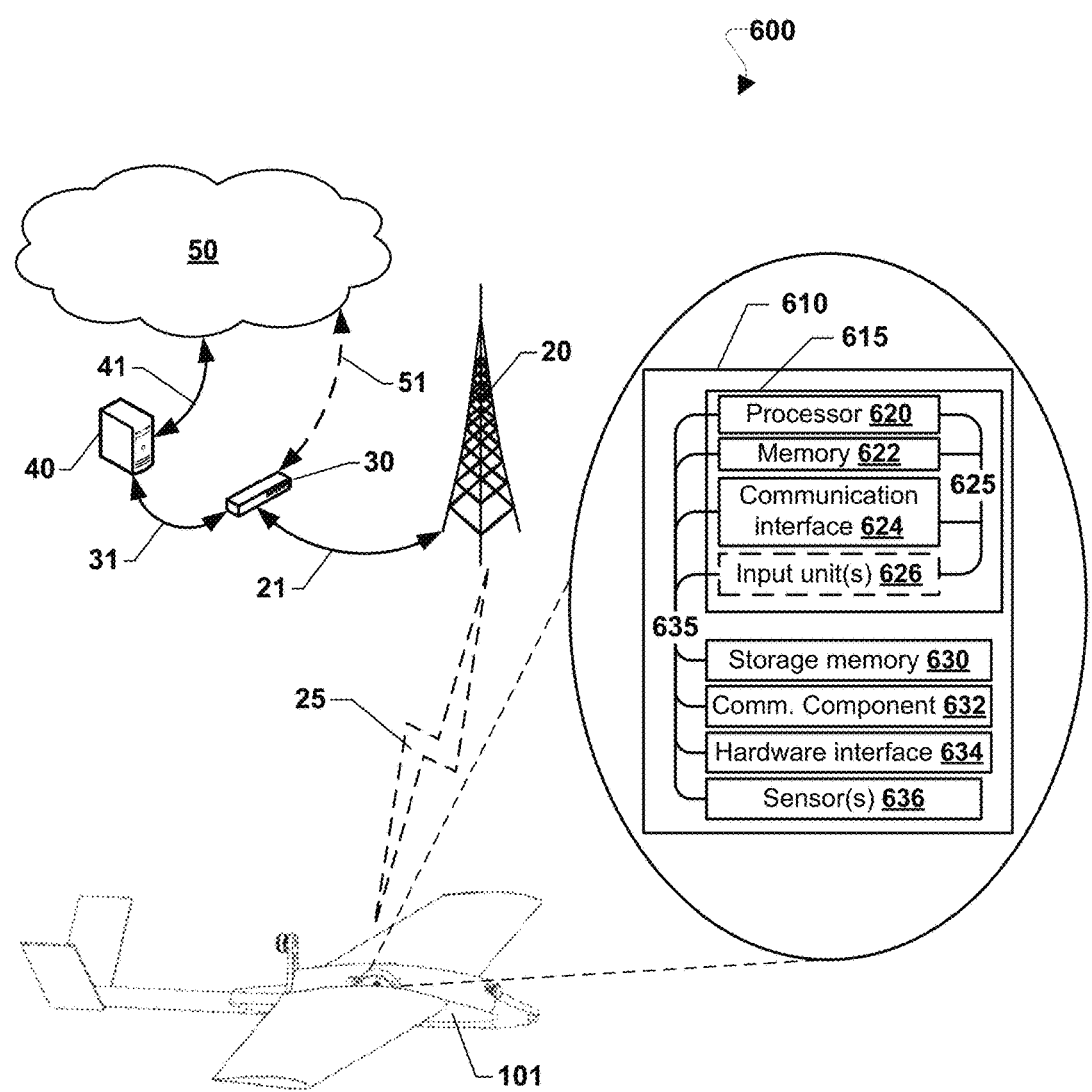
FIG. 6 is a schematic diagram illustrating a drone, a communication network, and components thereof according to various embodiments.

Various embodiments may be implemented within a variety of drones configured to communicate with one or more communication networks, an example of which suitable for use with various embodiments is illustrated in FIG. 6. With reference to FIGS. 1-6, the mission environment 600 may include the drone 101 and the base station 20, as well as a remote computing device 30, a remote server 40, and a communication network 50.

The base station 20 may provide the wireless communication link 25, such as through wireless signals to the drone 101. The base station 20 may include one or more wired and/or wireless communications connections 21, 31, 41, 51 to the communication network 50. The communication network 50 may in turn provide access to other remote base stations over the same or another wired and/or wireless communications connection. The remote computing device 30 may be configured to control the base station 20, the drone 101, and/or control wireless communications over a wide area network, such as providing a wireless access points and/or other similar network access point using the base station 20. In addition, the remote computing device 30 and/or the communication network 50 may provide access to a remote server 40. The drone 101 may be configured to communicate with the remote computing device 30 and/or the remote server 40 for exchanging various types of communications and data, including location information, navigational commands, data inquiries, and mission data.

The drone 101 may include a processing device 610 that is configured to monitor and control the various functionalities, sub-systems, and/or other components of the drone 101. For example, the processing device 610 may be configured to monitor and control various functionalities of the drone 101, such as any combination of modules, software, instructions, circuitry, hardware, etc. related to propulsion, navigation, power management, sensor management, and/or stability management.

The processing device 610 may house various circuits and devices used to control the operation of the drone 101. For example, the processing device 610 may include a processor 620 that directs the control of the drone 101. The processor 620 may include one or more processors configured to execute processor-executable instructions (e.g., applications, routines, scripts, instruction sets, etc.) to control flight, antenna usage, and other operations of the drone 101, including operations of various embodiments. In some embodiments, the processing device 610 may include memory 622 coupled to the processor 620 and configured to store data (e.g., flight plans, obtained sensor data, received messages, applications, etc.). The processor 620 and memory 622, along with (but not limited to) additional elements such as a communication interface 624 and one or more input unit(s) 626, may be configured as or include a system-on-chip (SOC) 615.

The processing device 610 may include more than one SoC 615 thereby increasing the number of processors 620 and processor cores. The processing device 610 may also include processors 620 that are not associated with an SoC 615. Individual processors 620 may be multi-core processors. The processors 620 may each be configured for specific purposes that may be the same as or different from other processors 620 of the processing device 610 or SOC 615. One or more of the processors 620 and processor cores of the same or different configurations may be grouped together. A group of processors 620 or processor cores may be referred to as a multi-processor cluster.

The terms "system-on-chip" or "SoC" as used herein, refer to a set of interconnected electronic circuits typically, but not exclusively, including one or more processors (e.g., 620), a memory (e.g., 622), and a communication interface (e.g., 624). The SOC 615 may include a variety of different types of processors 620 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SOC 615 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 615 may include one or more processors 620. The processing device 610 may include more than one SoC 615, thereby increasing the number of processors 620 and processor cores. The processing device 610 may also include processors 620 that are not associated with the SoC 615 (i.e., external to the SoC 615). Individual processors 620 may be multi-core processors. The processors 620 may each be configured for specific purposes that may be the same as or different from other processors 620 of the processing device 610 or the SOC 615. One or more of the processors 620 and processor cores of the same or different configurations may be grouped together. A group of processors 620 or processor cores may be referred to as a multi-processor cluster.

The processing device 610 may further include one or more sensor(s) 636, such as an altimeter or camera, that may be used by the processor 620 to determine flight attitude and location information to control various processes on the drone 101. For example, in some embodiments, the processor 620 may use data from sensors 636 (e.g., a light sensor using photoresistors, photodiodes, and/or phototransistors) as an input for determining whether to invert the drone 101. One or more other input units 626 may also be coupled to the processor 620. Various components within the processing device 610 and/or the SoC 615 may be coupled together by various circuits, such as a bus 625, 635 or another similar circuitry.

In various embodiments, the processing device 610 may include or be coupled to one or more communication components 632, such as a wireless transceiver, an onboard antenna, and/or the like for transmitting and receiving wireless signals through the wireless communication link 25. The one or more communication components 632 may be coupled to the communication interface 624 and may be configured to handle wireless wide area network (WWAN) communication signals (e.g., cellular data networks) and/or wireless local area network (WLAN) communication signals (e.g., Wi-Fi signals, Bluetooth signals, etc.) associated with ground-based transmitters/receivers (e.g., base stations, beacons, Wi-Fi access points, Bluetooth beacons, small cells (picocells, femtocells, etc.), etc.). The one or more communication components 632 may receive data from radio nodes, such as navigation beacons (e.g., very high frequency (VHF) omni-directional range (VOR) beacons), Wi-Fi access points, cellular network base stations, radio stations, etc.

The processing device 610, using the processor 620, the one or more communication components 632, and an antenna may be configured to conduct wireless communications with a variety of wireless communication devices, examples of which include the base station or cell tower (e.g., base station 20), a beacon, server, a smartphone, a tablet, or another computing device with which the drone 101 may communicate. The processor 620 may establish a bi-directional wireless communication link 25 via a modem and an antenna. In some embodiments, the one or more communication components 632 may be configured to support multiple connections with different wireless communication devices using different radio access technologies. In some embodiments, the one or more communication components 632 and the processor 620 may communicate over a secured communication link. The security communication links may use encryption or another secure means of communication in order to secure the communication between the one or more communication components 632 and the processor 620.

While the various components of the processing device 610 are illustrated as separate components, some or all of the components (e.g., the processor 620, the memory 622, and other units) may be integrated together in a single device or module, such as a system-on-chip module.

Drones may navigate or determine positioning using altimeters or navigation systems, such as Global Navigation Satellite System (GNSS), Global Positioning System (GPS), etc. In some embodiments, the drone 101 may use an alternate source of positioning signals (i.e., other than GNSS, GPS, etc.). The drone 101 may use position information associated with the source of the alternate signals together with additional information (e.g., dead reckoning in combination with last trusted GNSS/GPS location, dead reckoning in combination with a position of the drone takeoff zone, etc.) for positioning and navigation in some applications. Thus, the drone 101 may navigate using a combination of navigation techniques, including dead-reckoning, camera-based recognition of the land features below and around the drone 101 (e.g., recognizing a road, landmarks, highway signage, etc.), etc. that may be used instead of or in combination with GNSS/GPS location determination and triangulation or trilateration based on known locations of detected wireless access points.

In some embodiments, the processing device 610 of the drone 101 may use one or more of various input units 626 for receiving control instructions, data from human operators or automated/pre-programmed controls, and/or for collecting data indicating various conditions relevant to the drone 101. For example, the input units 626 may receive input from one or more of various components, such as camera(s), microphone(s), position information functionalities (e.g., a global positioning system (GPS) receiver for receiving GPS coordinates), flight instruments (e.g., attitude indicator(s), gyroscope(s), anemometer, accelerometer(s), altimeter(s), compass(es), etc.), keypad(s), etc. The camera(s) may be optimized for daytime and/or nighttime operation.

As described, the processor of the drone may be in a separate computing device that is in communication with the drone. In such embodiments, communications with the drone may be implemented using any of a variety of wireless communication devices (e.g., smartphones, tablets, smartwatches, etc.). Various forms of computing devices may be used to communicate with a processor of a drone, including personal computers, wireless communication devices (e.g., smartphones, etc.), servers, laptop computers, etc., to implement the various embodiments. In various embodiments, the drone 101 may be configured to access the server 40 to periodically acquire position information for identifying a location of the drone or access a database correlating drone position to whether to use a particular one of the first and second antennas for active communications and/or communication links with the server 40. For example, the drone may receive periodic communications, from the server 40, indicating position information, instructions to land, and/or database updates. Alternatively or in addition, the drone may send periodic communications to the server 40 providing current location coordinates of the drone and/or indicating that the drone has triggered the auto-rotation configuration.

Figure 7:
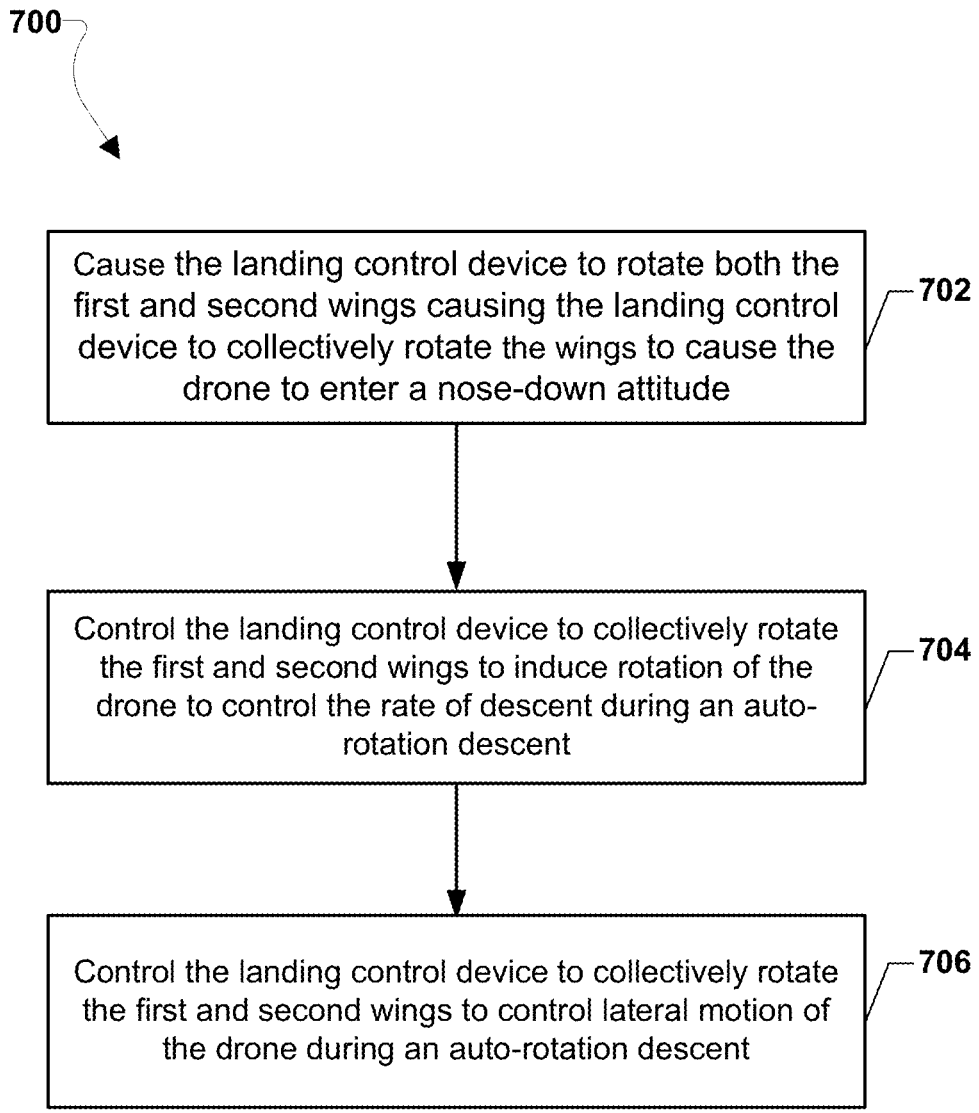
FIG. 7 is a process flow diagram illustrating a method of operating a drone according to some embodiments.

FIG. 7 illustrates a method 700 for operating a drone according to some embodiment. With reference to FIGS. 1-7, the method 700 may be implemented in a drone 101 having a landing control device (e.g., 110) configured to collectively rotate both first and second wings 106a, 106b independent of pivoting (i.e., pitcheron) movements. The method 700 may also be implemented by a processing device 610 that is configured to monitor and control the various functionalities, sub-systems, and/or other components of the drone 101.

In block 702, the processor may cause the landing control device to rotate both the first and second wings causing the landing control device to collectively rotate the wings to cause the drone to enter a nose-down attitude.

In block 704, the processor may control the landing control device to collectively rotate the first and second wings to induce autorotation (i.e., spinning) of the drone to control the rate of descent during an auto-rotation descent.

In block 706, processor may control the landing control device to collectively rotate the first and second wings to control lateral motion of the drone during an auto-rotation descent.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), flash drive, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A drone, comprising:
   a body having a longitudinal axis extending from a nose to a tail of the body;
   a first wing pivotally controlled by a first motor to pivot about a wing pivot axis extending laterally from the longitudinal axis of the body;
   a second wing pivotally controlled by a second motor to pivot independent of the first wing, about the wing pivot axis, wherein pivotally controlling the first and second wings provides pitcheron control in flight; and
   a landing control device configured to rotate both the first and second wings, independent of the first and second motors, wherein rotating the first and second wings in flight causes the drone to enter a nose-down attitude, wherein pivotally controlling the first and second wings while the drone is in the nose-down attitude enables control of decent rate and lateral motion during an auto-rotation descent of the drone.

2. The drone of claim 1, wherein rotating both the first and second wings to an auto-rotation configuration comprises rotating each of the first and second wings ninety degrees from a flight configuration.

3. The drone of claim 1, wherein pivotally controlling the first and second wings, while the drone is in the nose-down attitude controls at least one of steering and a rate of descent of the drone.

4. The drone of claim 1, further comprising:
a sensor configured to detect obstacles while the drone is in the nose-down attitude.

5. The drone of claim 1, wherein the first and second wings are operatively coupled to the landing control device.

6. The drone of claim 1, further comprising:
a power supply; and
a power level meter configured to detect when a power level of the power supply is below a power level threshold and trigger the landing control device to rotate both the first and second wings in response to the power level meter detecting that the power level is below the power level threshold.

7. The drone of claim 1,
wherein the landing control device is a landing carousel coupled to the body of the drone, and
wherein the landing carousel comprises a pivotal frame configured to rotate about a carousel axis extending laterally relative to the longitudinal axis of the body.

8. The drone of claim 7, wherein the carousel axis is offset from the wing pivot axis and disposed aft of a center of gravity of the drone.

9. The drone of claim 1, wherein the landing control device includes a wing pivot rod projecting laterally from opposed sides of the body along the wing pivot axis.

10. The drone of claim 1, wherein a first wing control rod projecting laterally from the body and offset from the wing pivot axis is configured to be moved by the first motor to provide pivotal control of the first wing.

11. The drone of claim 1, wherein the landing control device comprises:
a frame latch configured to hold the landing control device in a flight configuration for flying the drone, wherein release of the frame latch enables rotation of the first and second wings in the nose-down attitude.

12. The drone of claim 11, wherein the frame latch includes a locking tab configured to rotate between a locking position that prevents rotation of the first and second wings and an unlocked position that allows rotation of the first and second wings.

13. The drone of claim 11, wherein the frame latch includes a locking tab configured to engage a catch on the body for preventing rotation of the first and second wings.

14. The drone of claim 1, wherein the landing control device comprises:
a lock release motor configured to control rotation of the first and second wings,
wherein the lock release motor actively prevents the landing control device from rotating the first and second wings, and
wherein the landing control device is configured to rotate the first and second wings in response to insufficient power being supplied to the lock release motor.

15. The drone of claim 1, wherein the landing control device comprises:
an elastic device biasing rotation of the first and second wings; and
a frame latch configured to counteract the biasing of the elastic device.

16. A landing carousel for a drone, comprising:
a pivotal frame configured to be secured to a body of the drone and rotate relative to the body about a carousel axis extending laterally relative to a longitudinal axis of the body, wherein the pivotal frame pivotally supports a first wing on a first side of the body and a second wing on a second side of the body, opposed to the first side;
a first wing motor configured to pivot the first wing of the drone about a wing pivot axis extending parallel to the carousel axis; and
a second wing motor configured to pivot the second wing of the drone about the wing pivot axis independent of the pivot of the first wing, wherein rotation of the pivotal frame relative to the body rotates both the first and second wings about the carousel axis independent of the pivot of the first and second wings.

17. The landing carousel of claim 16, wherein the carousel axis is offset from the wing pivot axis.

18. The landing carousel of claim 16, wherein the carousel axis is disposed aft of a center of gravity of the drone.

19. The landing carousel of claim 16, wherein the pivotal frame is configured to support the first and second wing motors.

20. The landing carousel of claim 16, wherein the pivotal frame includes a wing pivot rod projecting laterally from opposed sides of the pivotal frame along the wing pivot axis.

21. The landing carousel of claim 16, wherein the pivotal frame includes a first wing control rod projecting laterally from the body and offset from the wing pivot axis, wherein the first wing control rod is configured to be moved by the first wing motor to provide pivotal control of the first wing.

22. The landing carousel of claim 16, further comprising:
a frame latch configured to hold the pivotal frame in a flight configuration for flying the drone, wherein release of the frame latch enables rotation of the pivotal frame about the carousel axis in a nose-down attitude.

23. The landing carousel of claim 22, wherein the frame latch includes a locking tab configured to rotate between a locking position that prevents rotation of the pivotal frame and an unlocked position that allows rotation of the pivotal frame.

24. The landing carousel of claim 22, wherein the frame latch includes a locking tab configured to engage a catch on the body for preventing rotation of the pivotal frame.

25. The landing carousel of claim 22, further comprising:
a lock release motor configured to maintain the frame latch in a locking position that prevents rotation of the pivotal frame, wherein deactivation of the lock release motor releases the frame latch.

26. The landing carousel of claim 16, further comprising:
an elastic device biasing rotation of the first and second wings; and
a frame latch configured to counteract the biasing of the elastic device.

27. A method of landing a drone having a landing control device coupled to first and second wings, comprising:
causing the landing control device to rotate the first and second wings to cause the drone to enter a nose-down attitude; and
collectively controlling the first and second wings while the drone is in the nose-down attitude to induce rotation about a long axis of a body of the drone and control a decent rate and lateral motion during an auto-rotation descent of the drone.

28. The method of claim 27, wherein causing the landing control device to rotate both the first and second wings to an auto-rotation configuration comprises rotating each of the first and second wings ninety degrees from a flight configuration.

29. The method of claim 27, wherein collectively controlling the first and second wings while the drone is in the nose-down attitude controls at least one of steering and a rate of descent of the drone.

30. A drone, comprising:
first and second wings;
means for rotating both the first and second wings to cause the drone to enter a nose-down attitude; and
means for collectively controlling the first and second wings while the drone is in the nose-down attitude to induce rotation about a long axis of a body of the drone and control a decent rate and lateral motion during an auto-rotation descent of the drone.

\* \* \* \* \*